(12) United States Patent
Zhang

(10) Patent No.: US 9,237,609 B2
(45) Date of Patent: Jan. 12, 2016

(54) LED BACKLIGHT DRIVING CIRCUIT, BACKLIGHT MODULE, AND LCD DEVICE

(71) Applicant: SHENZHEN CHINA STAR OPTOELECTRONICS TECHNOLOGY CO., LTD, Shenzhen (CN)

(72) Inventor: Hua Zhang, Shenzhen (CN)

( * ) Notice: Subject to any disclaimer, the term of this patent is extended or adjusted under 35 U.S.C. 154(b) by 133 days.

(21) Appl. No.: 13/982,753

(22) PCT Filed: Jun. 27, 2013

(86) PCT No.: PCT/CN2013/078141
§ 371 (c)(1),
(2) Date: Jul. 31, 2013

(87) PCT Pub. No.: WO2014/187004
PCT Pub. Date: Nov. 27, 2014

(65) Prior Publication Data
US 2014/0340296 A1 Nov. 20, 2014

(30) Foreign Application Priority Data

May 20, 2013 (CN) .......................... 2013 1 0188002

(51) Int. Cl.
*H05B 33/08* (2006.01)
*G09G 3/34* (2006.01)
*G09G 3/36* (2006.01)

(52) U.S. Cl.
CPC .............. *H05B 33/08* (2013.01); *G09G 3/3426* (2013.01); *H05B 33/0815* (2013.01); *G09G 3/3648* (2013.01)

(58) Field of Classification Search
CPC ...... H05B 33/08; G09G 3/3426; G09G 3/3648
See application file for complete search history.

(56) References Cited

U.S. PATENT DOCUMENTS

| 2008/0001547 A1* | 1/2008 | Negru ................... H02J 7/0065 315/189 |
| 2012/0262068 A1* | 10/2012 | Chi et al. ....................... 315/122 |
| 2014/0125243 A1* | 5/2014 | Ota ....................... H05B 41/282 315/210 |
| 2014/0232288 A1* | 8/2014 | Brandes ............. H05B 33/0803 315/250 |

FOREIGN PATENT DOCUMENTS

| CN | 101637065 A | 1/2010 |
| CN | 102014540 A | 4/2011 |
| CN | 102143639 A | 8/2011 |
| CN | 102413600 A | 4/2012 |
| CN | 202261964 U | 5/2012 |
| CN | 102595696 A | 7/2012 |
| CN | 202396030 U | 8/2012 |
| CN | 202603017 U | 12/2012 |

(Continued)

OTHER PUBLICATIONS

Wang Chao, the International Searching Authority written comments, Feb. 2014, CN.

*Primary Examiner* — Ilana Spar
*Assistant Examiner* — Mihir Rayan

(57) ABSTRACT

A light emitting diode (LED) backlight driving circuit includes a rectifier module, a voltage reduction module coupled to the rectifier module, and an LED lightbar coupled to the voltage reduction module. A city voltage is inputted to the rectifier module, and a pulse-width modulation (PWM) controls the voltage reduction module.

2 Claims, 2 Drawing Sheets

(56) References Cited

FOREIGN PATENT DOCUMENTS

| CN | 102956204 | A | 3/2013 |
| CN | 202939950 | U | 5/2013 |
| WO | WO2010131889 | A2 | 11/2010 |
| WO | WO2012063815 | A1 | 5/2012 |

* cited by examiner

LED BACKLIGHT DRIVING CIRCUIT, BACKLIGHT MODULE, AND LCD DEVICE

TECHNICAL FIELD

The present disclosure relates to the field of liquid crystal displays (LCDs), and more particularly to a light emitting diode (LED) backlight driving circuit, a backlight module, and an LCD device.

BACKGROUND

A liquid crystal display (LCD) device includes an LCD panel and a backlight module. The backlight module includes a light emitting diode (LED) backlight driving circuit. A typical LED backlight driving circuit uses a boost circuit, as shown in FIG. 1. A 220 V city voltage (alternating voltage) is rectifies as an input voltage 24 V (direct voltage) by a transformer T and a bridge rectifier circuit (AC/DC). An LED constant current driving chip controls a metal-oxide-semiconductor field-effect transistor (MOSFET) Q that adjusts voltage to turn on/off, and an inductor L, which can store energy and release energy, provides a great direct voltage for an LED lightbar. An equation of an output voltage of the boost circuit is: $V_o=V_{in}/(1-D)$ (D is a duty cycle of a driving signal of the MOSFET.

A range of voltage raised by the boost circuit is limited. Generally, the range of the voltage raised by the boost circuit is within 100 V. If the range of the voltage raised by the boost circuit needs to be increased, a boost device is added, such as adding the transformer, which increases cost.

SUMMARY

The aim of the present disclosure is to provide a light emitting diode (LED) backlight driving circuit, a backlight module, and a liquid crystal display (LCD) device capable of increasing an output voltage and reducing costs.

The aim of the present disclosure is achieved by the following method.

An LED the backlight driving circuit comprises a rectifier module, a voltage reduction module coupled to the rectifier module, and an LED lightbar coupled to the voltage reduction module. A city voltage is inputted to the rectifier module and a pulse-width modulation (PWM) controls the voltage reduction module.

Furthermore, the rectifier module comprises a full-wave rectifier. Transfer efficiency of the full-wave rectifier is great, which allows the full-wave rectifier to output constantly the direct voltage, the full-wave rectifier transfers the city voltage 220 V (alternating voltage) to the direct voltage 330 V to apply to different brightness requirements of the LED lightbar.

Furthermore, the voltage reduction module comprises an adjusting voltage controllable switch, an inductor, a diode, and a monitor unit that adjusts a duty cycle of the adjusting voltage controllable switch. An anode of the rectifier module is connected with the LED lightbar in series through the adjusting voltage controllable switch and the inductor. A cathode of the diode is coupled to one end of the adjusting voltage controllable switch that is adjacent to the inductor, an anode of the diode is coupled to a cathode of the rectifier module. This is a specific voltage reduction module comprising the adjusting voltage controllable switch, the inductor, and the diode. The adjusting voltage controllable switch comprises a metal-oxide-semiconductor field-effect transistor (MOSFET) controllable switch. The monitor unit outputs the driving signal to the adjusting voltage controllable switch, when the adjusting voltage controllable switch turns on, the diode turns off. The inductor and the LED lightbar are provided the voltage, the inductor stores energy and the electrolytic capacitor charges. When the adjusting voltage controllable switch turns off, an induced electromotive force of negative direction is generated in the inductor, and the inductor provides a great voltage for the LED lightbar, at this moment, the diode turns on, which forms a return circuit. The voltage of the LED lightbar is (namely the output voltage of the voltage reduction module) $V_o=V_{in}*D$ (D is the duty cycle of the driving signal of the adjusting voltage controllable switch). The city voltage is inputted to the rectifier module, thus the rectifier module outputs correspondingly the great direct voltage, where the direct voltage may reach or exceed requirement of a most brightness of the LED lightbar and does not need to be converted, namely the direct voltage applies to different of the LED lightbar. When the brightness of the LED lightbar reduces, the monitor unit reduces the duty cycle of the driving signal, where effective current flowing through the voltage reduction module is corresponding low, and loss of the adjusting voltage controllable switch is low. Thus, transfer efficiency of the voltage reduction module is greater than the boost circuit, which effectively reduces energy consumption and applies to different output voltage without adding a boost device. The present disclosure does not use a transformer between the city voltage and the rectifier module, and does not add the boost device when the great voltage is needed, which reduces cost of the entire circuit.

Furthermore, a capacitor is connected between the cathode of the rectifier module and one end of the inductor that is adjacent to the LED lightbar. When the adjusting voltage controllable switch turns off, the capacitor storing the energy and the inductor provides voltage for the LED lightbar to keep the brightness of the LED lightbar. A progress of the specific operation is that when the adjusting voltage controllable switch turns on, the diode turns off, where the inductor and the LED lightbar are provided the voltage, the inductor stores energy and the electrolytic capacitor charges. When the adjusting voltage controllable switch turns off, an induced electromotive force of negative direction is generated in the inductor, the inductor and the electrolytic capacitor provide voltage for the LED lightbar, and the diode turns on, which forms a return circuit. The voltage of the LED lightbar is (namely the output voltage of the voltage reduction module) $V_o=V_{in}*D$ (D is the duty cycle of the driving signal of the adjusting voltage controllable switch).

Furthermore, the capacitor is an electrolytic capacitor. The electrolytic capacitor may store more energy, which further stabilizes the brightness of the LED lightbar.

Furthermore, a number of the LED lightbar at least is two, and each of the LED lightbars is connected with each other in parallel. A number of the LED lightbar may be determined according to different size requirements of the LCD panel and different brightness requirements of the LCD panel.

Furthermore, a number of the LED lightbar at least is two, and each of the LED lightbars is connected with each other in parallel. The rectifier module comprises a full-wave rectifier, and the voltage reduction module comprises an adjusting voltage controllable switch, an inductor, a capacitor, a diode, and a monitor unit that adjusts a duty cycle of the adjusting voltage controllable switch. An anode of the full-wave rectifier is connected with the LED lightbar in series through the adjusting voltage controllable switch and the inductor. A cathode of the diode is coupled to one end of the adjusting voltage controllable switch that is adjacent to the inductor, an anode of the diode is coupled to a cathode of the full-wave rectifier. The capacitor is connected between the cathode of the full-wave rectifier and one end of the inductor that is adjacent to the LED lightbar, the capacitor is an electrolytic capacitor.

Transfer efficiency of the full-wave rectifier is great, which allows the full-wave rectifier to output constantly a direct voltage and the full-wave rectifier transfers the city voltage (alternating voltage) 220 V to the direct voltage 330 V to apply to different brightness requirements of the LED lightbar.

Furthermore, the voltage reduction module comprises the adjusting voltage controllable switch comprising the MOSFET, the inductor, the diode, and the monitor unit. The monitor unit outputs the driving signal to the adjusting voltage controllable switch, when the adjusting voltage controllable switch turns on, the diode turns off. The inductor and the LED lightbar are provided the voltage, the inductor stores energy and the electrolytic capacitor charges. When the adjusting voltage controllable switch turns off, an induced electromotive force of negative direction is generated in the inductor, the inductor and the electrolytic capacitor provide voltage for the LED lightbar, and the diode turns on, which forms a return circuit. The voltage of the LED lightbar is (namely the output voltage of the voltage reduction module) Vo=Vin*D (D is the duty cycle of the driving signal of the adjusting voltage controllable switch). When the adjusting voltage controllable switch turns off, the capacitor storing energy and the inductor provides voltage for the LED lightbar to keep the brightness of the LED lightbar. The electrolytic capacitor may store more energy, which further stabilizes the brightness of the LED lightbar.

Furthermore, the full-wave rectifier transfers the city voltage 220 V (alternating voltage) to the direct voltage 330 V, and applies to different brightness requirements of the LED lightbar through the voltage reduction module, the output voltage of the range of 0 V-300 V is outputted without changing circuit.

Furthermore, the LED backlight driving circuit comprises a constant current driving chip, and the monitor unit is integrated in the constant current driving chip. The constant current driving chip comprises a comparator and an adjusting dimming controllable switch. An input end of the adjusting dimming controllable switch is coupled to the cathode of the LED lightbar, and an output end of the adjusting dimming controllable switch is coupled to a ground terminal of the LED backlight driving circuit through a divider resistor. A reference voltage is inputted to a non-inverting input end of the comparator receives, and an inverting input end of the comparator is connected with the output end of the adjusting dimming controllable switch. The constant current driving chip individually controls dimming of each of the LED lightbars, and the monitor unit is integrated in the constant current driving chip to improve integration level of the LED backlight driving circuit, which achieves lightening and thinning of the LCD device.

A backlight module comprises a light emitting diode (LED) backlight driving circuit of the present disclosure.

A liquid crystal display (LCD) device comprises a backlight module of the present disclosure.

It should be understood, according to a formula of a boost circuit: Vo=Vin/(1−D), when the LED lightbar needs a great voltage, a duty cycle of driving signal of the MOSFET is corresponding great, it means that turn-on time of an adjusting voltage controllable switch increases in one period, and a current flowing through the MOSFET is corresponding great, which causes power loss and high energy consumption, and generates heat. The present disclosure uses the rectifier module inputted the city voltage, thus the rectifier module outputs correspondingly a great high direct voltage, where the direct voltage may reach or exceed requirement of the most brightness of the LED lightbar and does not need to be converted, namely the direct voltage applies to different of the LED lightbar. When the brightness of the LED lightbar need to be reduced, it can be obtained by reducing the output voltage of the rectifier module by the voltage reduction module. The voltage reduction module reduces the output voltage of the rectifier module by only reducing the duty cycle of the voltage reduction module. The duty cycle of the voltage reduction module is low, effective current flowing through the voltage reduction module is corresponding low, and loss of the voltage reduction module is low. Thus, transfer efficiency of the voltage reduction module is greater than the boost circuit, which effectively reduces energy consumption and applies to different output voltage without adding a boost device. The present disclosure does not use a transformer between the city voltage and the rectifier module, and does not add the boost device when the great voltage is needed, which reduces cost of the entire circuit.

DETAILED DESCRIPTION

Figure 1:
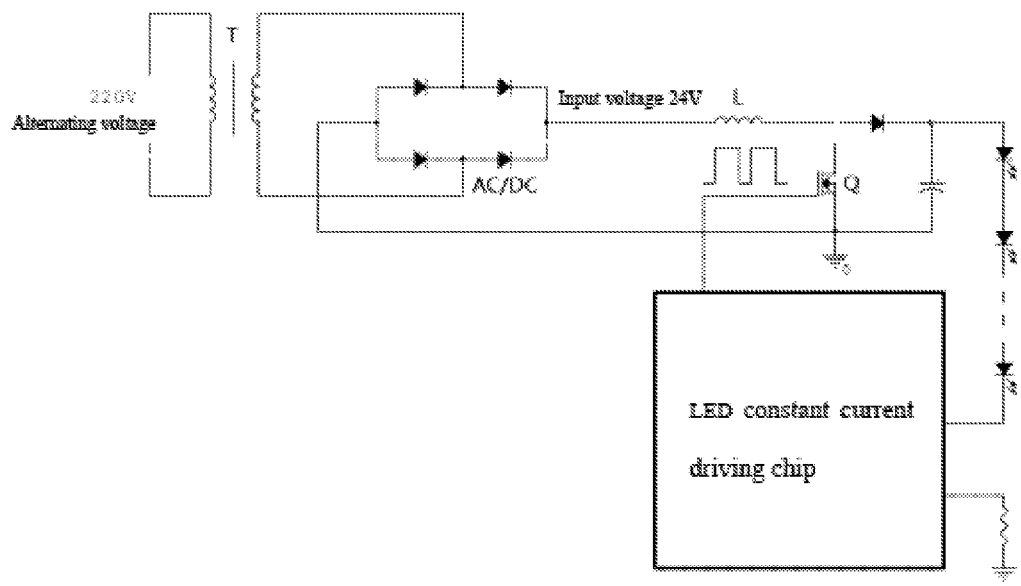
FIG. 1 is a schematic diagram of a typical light emitting diode (LED) backlight driving circuit.
Figure 2:
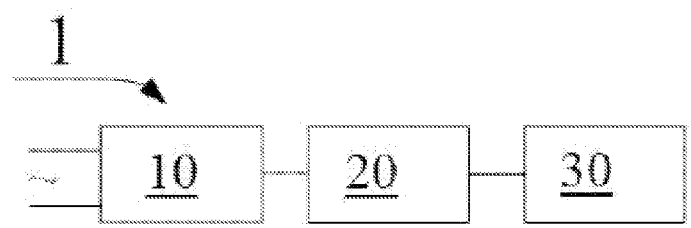
FIG. 2 is a schematic block diagram of a light emitting diode (LED) backlight driving circuit of the present disclosure.

The present disclosure provides a liquid crystal display (LCD) device comprising an LCD panel and a backlight module that provides light source for the LCD panel. The backlight module comprises a light emitting diode (LED) backlight driving circuit. As shown in FIG. 2, the LED backlight driving circuit 1 comprises a rectifier module 10 inputted a city voltage (alternating voltage), a voltage reduction module 20 coupled to the rectifier module 10, and an LED lightbar 30 coupled to the voltage reduction 20. A pulse-width modulation (PWM) is used to control the voltage reduction module 20.

The city voltage is an alternating voltage having an industrial frequency. Two common industrial frequency of the alternating voltage in the world are 50 Hz and 60 Hz. A range of household alternating voltage is 100 V-380 V. For example, a computer room generally uses 380 V, 50 Hz of a three-phase voltage as a power source, but the rectifier module of the power source of the device uses 220 V with single-phase. A standard of the city voltage in the world is different, such as 220 V in china, 110 V in Japan, and 110 V in USA.

It should be understood, according to a formula of a boost circuit: Vo=Vin/(1−D), when the LED lightbar needs a great voltage, a duty cycle D of a driving signal of a metal-oxide-semiconductor field-effect transistor (MOSFET) is corresponding great, it means that turn-on time of an adjusting voltage controllable switch increases in one period, and a current flowing through the MOSFET is corresponding great, which causes power loss and high energy consumption, and generates heat. The present disclosure uses the rectifier module inputted the city voltage, thus the rectifier module outputs correspondingly a great direct voltage, where the direct voltage may reach or exceed requirement of a most brightness of the LED lightbar and does not need to be converted, namely the direct voltage applies to different the LED lightbars. When the brightness of the LED lightbar needs to be reduced, it can be obtained by reducing the output voltage of the rectifier module by the voltage reduction module. The voltage reduction module reduces the output voltage of the rectifier module by only reducing the duty cycle of the voltage reduction module. The duty cycle of the voltage reduction module is low, effective current flowing through the voltage reduction module is corresponding low, and loss of the voltage reduction module is low. Thus, transfer efficiency of the voltage reduction module is greater than the boost circuit, which effectively reduces energy consumption and applies to different output voltage without adding a boost device. The present disclosure does not use a transformer between the city voltage and the rectifier module, and does not add the boost device when the great voltage is needed, which reduces cost of the entire circuit.

The present disclosure is further described in detail in accordance with the figures and the exemplary examples.

Figure 3:
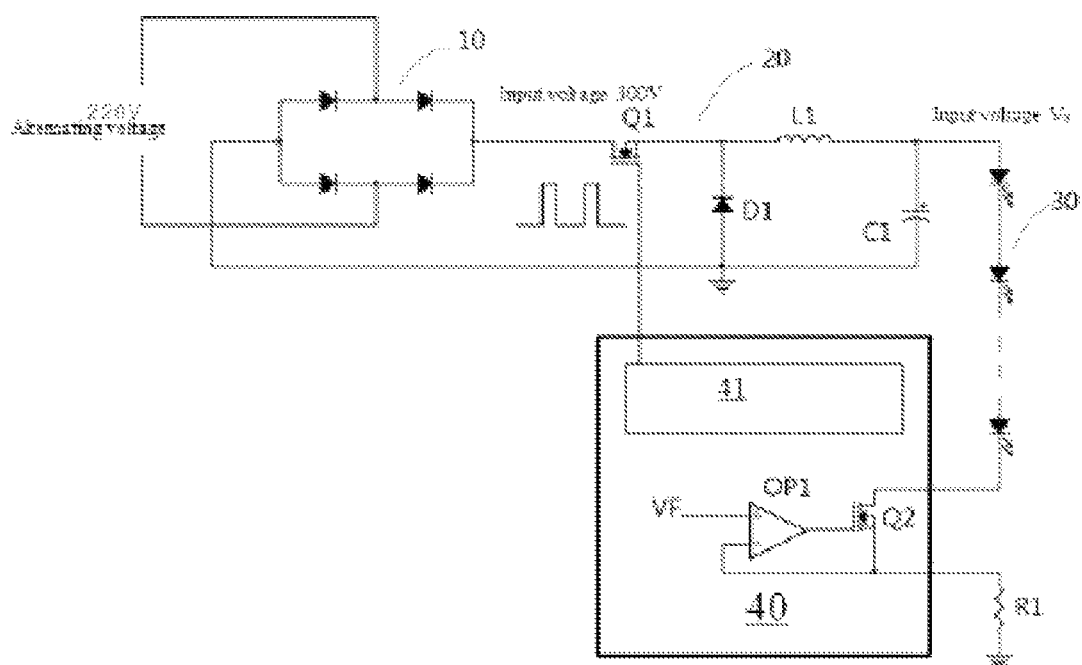
FIG. 3 is a schematic diagram of a high emitting diode (LED) backlight driving circuit of an example of the present disclosure.

As shown in FIG. 2 and FIG. 3, an LED backlight driving circuit 1 comprises a rectifier module 10 inputted a city voltage (alternating voltage), a voltage reduction module 20 coupled to the rectifier module 10, and an LED lightbar 30 coupled to the voltage reduction module 20. The rectifier module 10 comprises a full-wave rectifier. The LED backlight driving circuit 1 comprises one LED lightbar 30 as shown in FIG. 3, and the LED backlight driving circuit 1 may also comprise a plurality of LED lightbars 30 connected with each other in parallel. Transfer efficiency of the full-wave rectifier is great, which allows the full-wave rectifier to output constantly the direct voltage, the full-wave rectifier transfers the city voltage 220 V (alternating voltage) to the direct voltage 330 V to apply to different brightness requirements of the LED lightbar. A number of the LED lightbar may be determined according to different size requirements of the LCD panel and different brightness requirements of the LCD panel.

The voltage reduction module 20 comprises an adjusting voltage controllable switch Q1, an inductor L1, a capacitor C1, a diode D1, and a monitor unit 41 that adjusts the duty cycle of the adjusting voltage controllable switch Q1. An anode of the full-wave rectifier is connected with the LED lightbar in series through the adjusting voltage controllable switch Q1 and the inductor L1. A cathode of the diode D1 is coupled to one end of the adjusting voltage controllable switch Q1 that is adjacent to the inductor L1. An anode of the diode D1 is coupled to a cathode of the full-wave rectifier. The capacitor C1 is connected in series between the cathode of the full-wave rectifier and one end of the inductor L1 that is adjacent to the LED lightbar 30. The capacitor C1 is an electrolytic capacitor.

The monitor unit 41 outputs the driving signal to the adjusting voltage controllable switch Q1, when the adjusting voltage controllable switch Q1 turns on, the diode D1 turns off. The inductor L1 and the LED lightbar 30 are provided the voltage, the inductor L1 stores energy and the electrolytic capacitor C1 charges. When the adjusting voltage controllable switch Q1 turns off, an induced electromotive force of negative direction is generated in the inductor L1, the inductor L1 and the electrolytic capacitor C1 provide a great voltage for the LED lightbar 30, at this moment, the diode D1 turns on, which forms a return circuit. The voltage of the LED lightbar 30 is (namely the output voltage of the voltage reduction module 20) Vo=Vin*D (D is the duty cycle of the driving signal of the adjusting voltage controllable switch Q1). The capacitor C1 may store energy, when the adjusting voltage controllable switch Q1 turns off, the capacitor C1 and the inductor L1 provide the great voltage for the LED lightbar 30 to keep the brightness of the LED lightbar 30, and the electrolytic capacitor C1 may store more energy, which may stabilize the brightness of the LED lightbar 30.

The LED backlight driving circuit 1 comprises a constant current driving chip 40, and the monitor unit is integrated in the constant current driving chip 40. The constant current driving chip comprises a comparator OP1 and an adjusting dimming controllable switch Q2. An input end of the adjusting dimming controllable switch Q2 is coupled to the cathode of the LED lightbar 30, and an output end of the adjusting dimming controllable switch Q2 is coupled to a ground terminal of the LED backlight driving circuit through a divider resistor R1. A reference voltage VF is inputted to a non-inverting input end of the comparator OP1, and an inverting input end of the comparator OP1 is connected with the output end of the adjusting dimming controllable switch Q2.

The constant current driving chip individually controls dimming of each of the LED lightbars, and the monitor unit is integrated in the constant current driving chip to improve integration level of the LED backlight driving circuit, which achieves lightening and thinning of the LCD device In the example, the full-wave rectifiers transfers the city voltage 220V (alternating voltage) to the direct voltage 330V, and applies to different brightness requirements of the LED lightbar through the voltage reduction module, the output voltage of the range of 0 V-300 V is outputted without changing circuit.

The present disclosure is described in detail in accordance with the above contents with the specific exemplary examples. However, this present disclosure is not limited to the specific examples. For the ordinary technical personnel of the technical field of the present disclosure, on the premise of keeping the conception of the present disclosure, the technical personnel can also make simple deductions or replacements, and all of which should be considered to belong to the protection scope of the present disclosure.

I claim:

1. A light emitting diode (LED) backlight driving circuit, comprising:
    a rectifier module:
    a voltage reduction module coupled to the rectifier module, the voltage reduction module comprising an adjusting voltage controllable switch, an inductor, and a diode; and
    an LED lightbar coupled to the voltage reduction module;
    wherein an anode of the rectifier module is connected to the adjusting voltage controllable switch, the inductor and the LED lightbar in series, and a city voltage is inputted to the rectifier module, and a pulse-width modulation (PWM) is used to control the voltage reduction module;
    wherein a number of the LED lightbar at least is two, and each of the LED lightbars is connected with each other in parallel; the rectifier module comprises a full-wave rectifier; wherein the voltage reduction module comprises a capacitor and a monitor unit that adjusts a duty cycle of the adjusting voltage controllable switch;
    an anode of the full-wave rectifier is connected with the LED lightbar in series through the adjusting voltage controllable switch and the inductor; a cathode of the diode is coupled to one end of the adjusting voltage controllable switch that is adjacent to the inductor: an anode of the diode is coupled to a cathode of the full-wave rectifier; the capacitor is connected between the cathode of the full-wave rectifier and one end of the inductor that is adjacent to the LED lightbar; the capacitor is an electrolytic capacitor, and a constant current driving chip, and the monitor unit is integrated in the constant current driving chip; the constant current driving chip comprises a comparator and a adjusting dimming controllable switch; an input end of the adjusting dimming controllable switch is coupled to the cathode of the LED lightbar, and an output end of the adjusting dimming controllable switch is coupled to a ground terminal of the LED backlight driving circuit through a divider resistor; a reference voltage is inputted to a non-inverting input end of the comparator; and an inverting input end of the comparator is connected with the output end of the adjusting dimming controllable switch.

2. A backlight module comprising:

a light emitting diode (LED) backlight driving circuit;

wherein the LED backlight driving circuit comprises a rectifier module;

a voltage reduction module coupled to the rectifier module, the voltage reduction module comprising an adjusting voltage controllable switch, an inductor, and a diode; and an LED lightbar coupled to the voltage reduction module;

an anode of the rectifier module is connected to the adjusting voltage controllable switch, the inductor and the LED lightbar in series, and a city voltage is inputted to the rectifier module, and a pulse-width modulation (PWM) is used to control the voltage reduction module;

wherein a number of the LED lightbar at least is two, and each of the LED liahtbars is connected with each other in parallel; the rectifier module comprises a full-wave rectifier; wherein the voltage reduction module comprises a capacitor and a monitor unit that adjusts a duty cycle of the adjusting voltage controllable switch;

an anode of the full-wave rectifier is connected with the LED lightbar in series through the adjusting voltage controllable switch and the inductor; a cathode of the diode is coupled to one end of the adjusting voltage controllable switch that is adjacent to the inductor; an anode of the diode is coupled to a cathode of the full-wave rectifier; the capacitor is connected between the cathode of the full-wave rectifier and one end of the inductor that is adjacent to the LED lightbar; the capacitor is an electrolytic capacitor; and a constant current driving chip, and the monitor unit is integrated in the constant current driving chip; the constant current driving chip comprises a comparator and a adjusting dimming controllable switch; an input end of the adjusting dimming controllable switch is coupled to the cathode of the LED lightbar, and an output end of the adjusting dimming controllable switch is coupled to a ground terminal of the LED backlight driving circuit through a divider resistor; a reference voltage is inputted to a non-inverting input end of the comparator; and an inverting input end of the comparator is connected with the output end of the adjusting dimming controllable switch.

* * * * *